(12) United States Patent
Kjeldsen

(10) Patent No.: US 7,648,412 B2
(45) Date of Patent: Jan. 19, 2010

(54) POULTRY DEFEATHERING APPARATUS

(75) Inventor: Poul Kjeldsen, Ebeltoft (DK)

(73) Assignee: Linco Food System A/S, Tridge (DK)

( * ) Notice: Subject to any disclaimer, the term of this patent is extended or adjusted under 35 U.S.C. 154(b) by 0 days.

(21) Appl. No.: 12/158,341

(22) PCT Filed: Dec. 21, 2005

(86) PCT No.: PCT/DK2005/000811
§ 371 (c)(1),
(2), (4) Date: Jun. 20, 2008

(87) PCT Pub. No.: WO2007/071236
PCT Pub. Date: Jun. 28, 2007

(65) Prior Publication Data
US 2008/0293346 A1    Nov. 27, 2008

(51) Int. Cl.
*A22C 25/02* (2006.01)
(52) U.S. Cl. ........................................ 452/88
(58) Field of Classification Search ............. 452/82–93; 15/22.1, 28, 97.1, 110, 114, 117, 167.1, 245
See application file for complete search history.

(56) References Cited
U.S. PATENT DOCUMENTS

| | | | |
|---|---|---|---|
| 2,657,321 A * | 10/1953 | Smithson, Jr. ................. | 310/50 |
| 2,668,968 A * | 2/1954 | Dobrowolski .................. | 15/28 |
| 3,235,904 A | 2/1966 | Brown et al. | |
| 3,524,217 A * | 8/1970 | Schuster ...................... | 452/89 |
| 3,596,309 A | 8/1971 | Vertegaal | |
| 4,175,302 A * | 11/1979 | Scheier et al. ................ | 452/93 |
| 4,179,772 A * | 12/1979 | Harben, Jr. .................... | 452/90 |
| 4,329,760 A * | 5/1982 | van Mil ........................ | 452/91 |
| 4,514,879 A * | 5/1985 | Hazenbroek .................. | 452/91 |
| 5,500,972 A * | 3/1996 | Foster ........................... | 15/28 |
| 5,640,735 A * | 6/1997 | Manning ....................... | 15/29 |
| 5,853,320 A | 12/1998 | Wathes et al. | |
| 6,918,825 B2 | 7/2005 | Conaway | |

FOREIGN PATENT DOCUMENTS

DE    27 26 824 A1    12/1977
GB    1 263 374 A    2/1972

* cited by examiner

*Primary Examiner*—Thomas Price
(74) *Attorney, Agent, or Firm*—Sughrue Mion, PLLC

(57) ABSTRACT

Poultry defeathering apparatus comprising at least one defeathering assembly (6) with a plurality of picking heads (7). Each picking head has a base member (15) provided with at least one flexible picking device (19). The base member is rotatable with respect to a support part (9). The flexible picking device (19) is rotatable with respect to the base member and is connected to a drive for rotating it with respect to the base member in a rotating movement different from the rotating movement of the base member with respect to the support part.

25 Claims, 5 Drawing Sheets

POULTRY DEFEATHERING APPARATUS

TECHNICAL FIELD

The present invention relates to a poultry defeathering apparatus comprising at least one defeathering assembly, wherein said defeathering assembly has a support part and a plurality of picking heads mounted at the support part, and the individual picking head has a base member provided with at least one flexible picking device, which base member is rotatable with respect to the support part of the defeathering assembly.

BACKGROUND ART

Such an apparatus is known from U.S. Pat. No. 3,235,904 where each picking head has twelve flexible picking devices shaped as flexible fingers. The flexible fingers are affixed to the base member at a distance from the axis of rotation of the base member so that the fingers tend to flex outwards under the influence of centrifugal forces when the base member rotates. U.S. Pat. No. 3,596,309 describes another defeathering apparatus using flexible picking devices mounted on picking heads, and U.S. Pat. No. 4,514,879 describes a further defeathering apparatus using six flexible picking devices per picking head.

In these prior art apparatuses the flexible picking devices comprise only a single flexible picking finger per picking device. Picking devices with many picking elements are disclosed in U.S. Pat. No. 6,918,825 where picking elements in the form of bristles, filaments or fibers are arranged in brush-like clusters and affixed to the picking device. The individual picking head can carry e.g. twelve picking elements of this type.

DISCLOSURE OF INVENTION

The capacities and line speeds of poultry processing plants have been ever increasing for years and this causes problems in relation to the defeathering operations because the poultry can rather easily be subjected to forces damaging the carcass as the picking elements impinge on and move across the surface of the bird. If the picking elements interact too heavily with the bird the result can be downgraded carcass quality and loss of yield. On the other hand, it is important to obtain carcasses that have been fully defeathered, also when the line speed is high.

The present invention aims at improving the efficiency of the picking heads in the poultry defeathering apparatuses.

With a view to this the poultry defeathering apparatus is, according to the present invention, characterized in that said at least one flexible picking device is rotatable with respect to the associated base member on which it is mounted, and that said at least one flexible picking device is connected to a drive for rotating it with respect to the associated base member in a rotating movement different from the rotating movement of the base member with respect to the support part of the defeathering assembly.

The rotation of the picking devices in relation to the base member rotates the individual picking device in a small-radius circular movement in relation to the outside of the bird, whereas the rotation of the base member with respect to the support part rotates the individual picking device in a large-radius circular movement in relation to the outside of the bird. As the radius in the latter movement is relatively large this movement cause the picking device to perform a sliding-like movement in relation to the outside of a bird. The small-radius rotation of the individual picking device changes the movements performed by the picking device in relation to the outside of a bird from said sliding-like movements and into more vigorous rotating movements.

In addition to the improvement in picking by the changed pattern of rotation of the picking devices, the effective picking area covered by the individual picking device is also increased, as the rotation of the individual picking device around its axis causes the outer end of the flexible picking device to flare out and by this increase the contact area on the carcass.

The smaller radius in the rotation of the picking devices in relation to the base member also cause the individual picking device to more quickly repeat its movements over the same area on the outside of the bird while the bird is present opposite the picking device, and to more easily also contact small feathers and hairs present in locally folded areas or depressed areas on the outside of the carcass. This also improves the picking in the neck and tail areas of the carcass.

The combination of the rotating movement of the picking device and the different rotating movement of the base member consequently results in a suitable coverage of the complete carcass due to the rotation of the base member and a suitable vigorous picking in the local area of the carcass due to the rotation of the picking devices.

In a preferred embodiment the rotational speed of said at least one picking device with respect to the associated base member during operation of the poultry defeathering apparatus is different from the rotational speed of this base member with respect to the support part of the defeathering assembly. It is possible to rotate the picking devices with the same speed (rpm) as the base member, or with a lower speed than the base member, but preferably the picking devices are rotated with a higher speed (rpm) than the base member because the higher speed increases the local picking action.

In a further preferred embodiment the direction of rotation of the at least one picking device with respect to the associated base member is opposite to the direction of rotation of this base member with respect to the support part of the defeathering assembly. The counter-rotating picking devices produce larger variations in the relative speed between the end of the picking device and the surface of the carcass than the variations present in an embodiment where the picking devices rotate in the same direction of rotation as the base member. It is believed that the larger variations in the relative speed are an advantage in view of obtaining a complete defeathering.

Each base member preferably has a plurality of picking devices mounted mutually spaced apart on the associated base member, because this allows for making the apparatus rather compact in relation to its capacity. However, it is possible to use only a single picking device on each picking head, and in this case the picking device is asymmetrically mounted on the base member so that the base member rotates about a rotational axis different from the rotational axis of the picking device.

The picking devices can be provided with individual drives, but for the sake of simplicity it is preferred that all picking devices mounted on the same base member are driven to rotate with respect to the base member by a common drive.

In a further preferred embodiment at least some of the picking devices comprise a plurality of elongate picking elements extending from a base part mounted to the base member of the picking head. It is a special advantage in connection with the rotating picking devices according to the present invention to use a plurality of elongate picking elements, because the above-mentioned flare out effect is enhanced by using more than one or a few elongate picking elements on the individual picking device.

The latter embodiment can be further developed by raising the number of picking element to such a high number on at least some of the picking devices that said plurality of elongate picking elements are arranged in a cluster on the base part. With the picking elements arranged in a cluster the picking device obtains a brush-like character.

In a further embodiment the number of picking elements on at least one of the picking devices is substantially lower than the number of picking elements on some of the other picking devices. By using picking devices of different designs in the apparatus, the poultry is subjected to a more wide range of picking actions, and this increases the cleanliness of the picked carcasses. The ultimate low number is obtainable when at least one of the picking devices has only a single picking element, and in that case the picking element is preferably constructed as a rubber finger.

Manufacturing and maintenance of the apparatus is simplified when all picking devices mounted on the same base member are of the same construction. These advantages can be further improved by making all picking heads in said defeathering assembly of the same construction, or even further by making all picking heads in the apparatus of the same construction.

However, it is often preferable to make the apparatus so that some of the picking heads in the apparatus, or at least one of the picking heads in the defeathering assembly includes picking devices of a construction different from picking devices on other of the picking heads in said defeathering assembly. The advantage of doing this is to allow said at least one picking head to pick feathers or hairs that cannot readily be picked by the picking devices on said other of the picking heads.

In further embodiments at least one, and optionally every picking head in the assembly includes at least two different types of picking devices, suitably at least one picking device having many elongate picking elements arranged in a cluster and at least one other picking device having relatively few picking elements, such as from two to 15 elongate picking elements of more sturdy individual dimensions than the elongate picking elements in the cluster. The use of picking devices of different types on the individual picking head can be utilized to improve the overall picking action of the head. The different picking devices are located near each other when mounted on the same picking head, and the action of one of the picking devices onto the outside of the bird can be supplemented and enhanced by the action of the neighbouring picking device of different type. To give an example, if a rather large and stiff feather cannot be picked by the picking device having a cluster of elements then an adjacent picking device with only a few elements of higher stiffness can pick the stiff feather and expose the smaller feathers below to the action of the picking device having the cluster of elements. The picking heads having a combination of different picking devices thus allows for more quickly performing a complete defeathering.

In a further embodiment the rotational speed of at least one picking device with respect to the associated base member is adjustable or can be set to a predetermined value, or can be set to follow a predetermined pattern of variation during defeathering of a bird. Such adjustment of the rotational speed provides the advantage of adapting the speed to poultry of different kinds or different sizes, or to poultry having different properties due to other causes than kind or size, such as when poultry has been raised using another feed formula than the previously treated poultry. In the embodiment where the rotational speed of at least one picking device can be set to follow a predetermined pattern of variation during defeathering of a bird it is possible to adjust the rotational speed to the area of the bird currently being picked.

In addition or as an alternative to adjusting the speed of the picking device it is in a further embodiment the rotational speed of at least one base member with respect to the support part of the defeathering assembly that is adjustable or can be set to a predetermined value, or can be set to follow a predetermined pattern of variation during defeathering of a bird. Also this kind of adjustment of the rotational speed provides the advantage of adapting the speed to poultry of different kinds, different sizes, or different properties.

BRIEF DESCRIPTION OF DRAWINGS

In the following, non-limiting examples of embodiments according to the present invention are described in further detail with reference to the highly schematic drawings, on which

MODES FOR CARRYING OUT THE INVENTION

A poultry defeathering apparatus according to the present invention is part of a poultry processing line in which killed birds are fed to the apparatus suspended from shackles in an overhead conveyor 1 (a shackle line). Prior to the feeding into the apparatus the birds can have passed through scalding equipment where the effect of the hot water or another heat source loosen the feathers and facilitate their subsequent removal from the carcasses. However, the scalding treatment is optional.

Figure 1:
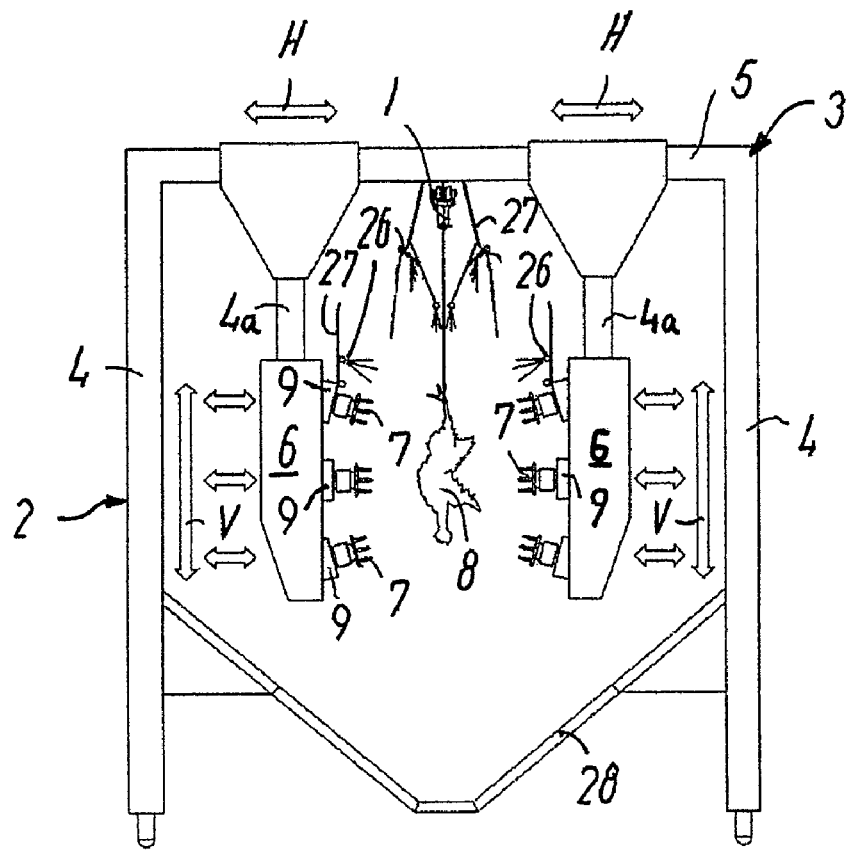
FIG. 1 is an end view of a poultry defeathering apparatus in one embodiment.

The poultry defeathering apparatus according to the present invention can be arranged in various manners along the conveyor 1. One general embodiment is illustrated in FIG. 1. The poultry defeathering apparatus 2 comprises a frame 3 having at least four uprights 4 and at least two horizontal girders 5 where each girder extends horizontally between a pair of uprights 4. The plucking part comprises two substantially identical, but mirrored, defeathering assemblies 6, which are mounted on vertical supports 4a. Each vertical support 4a is mounted on girders 5 slidable along the girders in directions of arrow H. The individual defeathering assembly 6 can adjust its positioning in the vertical direction by sliding up or down on the associated vertical support 4a in direction of arrow V. As an alternative girders 5 can be slidable on the uprights in order to adjust the vertical position of assemblies 6. The two defeathering assemblies 6 are arranged on opposite sites of the conveyor 1 and are adjusted in height and in their horizontal positions so that picking heads 7 can contact the bird surface simultaneously on both sides of the suspended birds 8.

Figure 2:
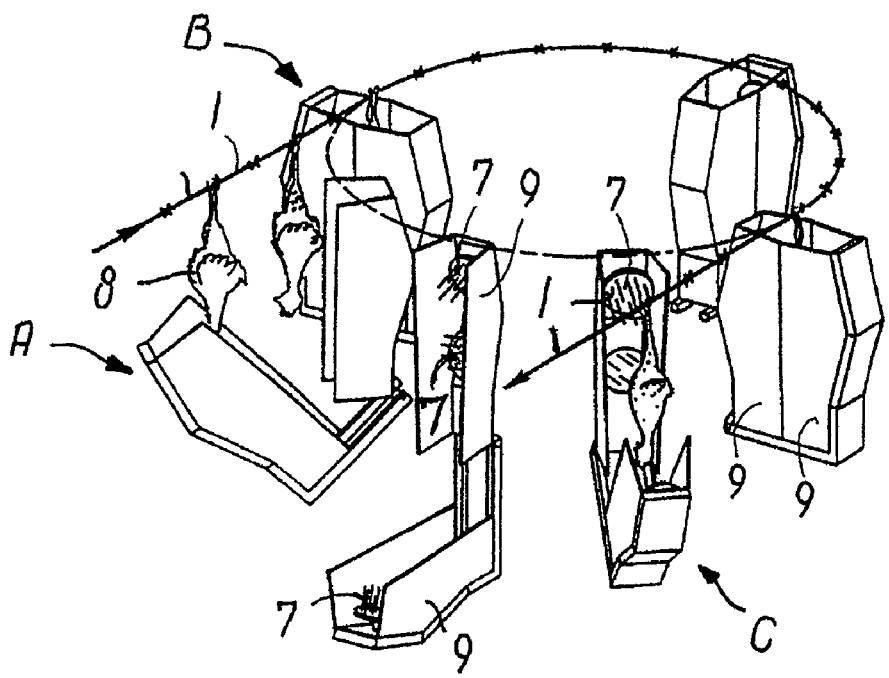
FIG. 2 is an end view of a poultry defeathering apparatus in another embodiment.

Another general embodiment of the apparatus according to the present invention is outlined in FIG. 2. For the same of simplicity the same reference numerals are used in the different embodiments for details of the same or similar type. The main differences between the two general embodiments are firstly that in FIG. 1 defeathering assemblies 6 are arranged along a straight section of overhead conveyor 1 and are stationary with respect to the ground so that conveyor 1 transports the birds through assemblies 6 while the picking occurs, whereas defeathering assemblies 6 in FIG. 2 are arranged at a carousel at which conveyor 1 changes direction and assemblies 6 follow the individual bird through the carousel while the picking occurs.

In both general embodiments each defeathering assembly 6 has a plurality of picking heads 7. In FIG. 1 the picking heads are arranged in horizontal rows at several levels. There can be e.g. from two to five rows of picking heads 7. The picking heads can be displaceable towards or away from the bird 8 in different manners. In one embodiment the displacement can be performed for the individual head, and in another only by displacing all heads in the assembly in a common movement. It is also possible to let some or all of the picking heads be tiltable with respect to the bird, such as tiltable in the horizontal direction and/or in the vertical direction in order to position the picking head efficiently in relation to the bird surface to be picked. In FIG. 2 the picking heads are arranged at several levels on opposite sides of the bird, and the two support parts 9 carrying the picking heads can be shifted between an open position indicated at arrow A for receiving a bird, a closed position indicated art arrow B for initiation of the picking, and an open position indicated at arrow C for delivering the defeathered carcass for further processing along the line.

Figures 5, 6:
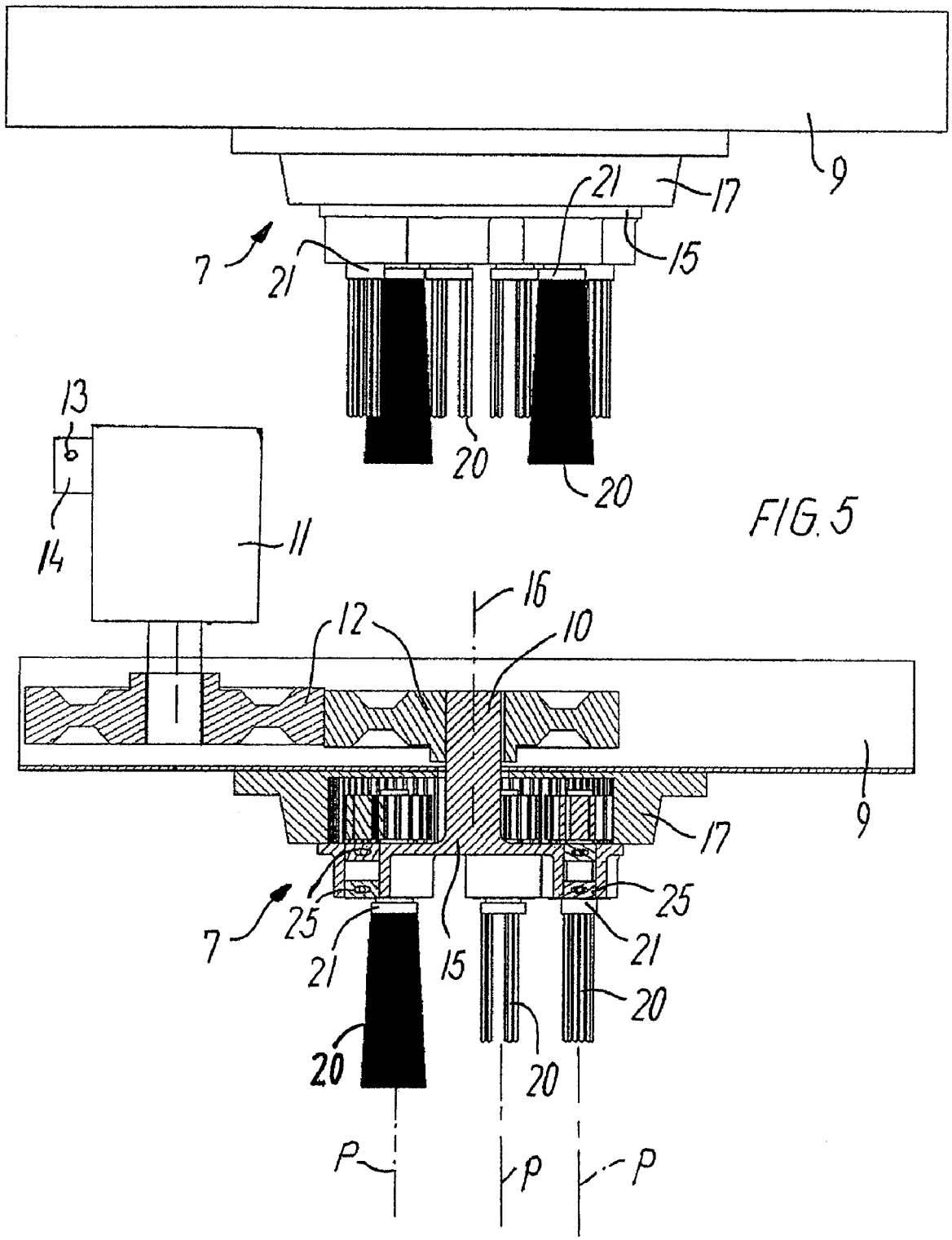
FIG. 6 is a cross-section along the line VI-VI in FIG. 3 which fo the sake of clarity has been simplified to illustrate only the major components illustrating how the picking head is driven.
Figure 7:
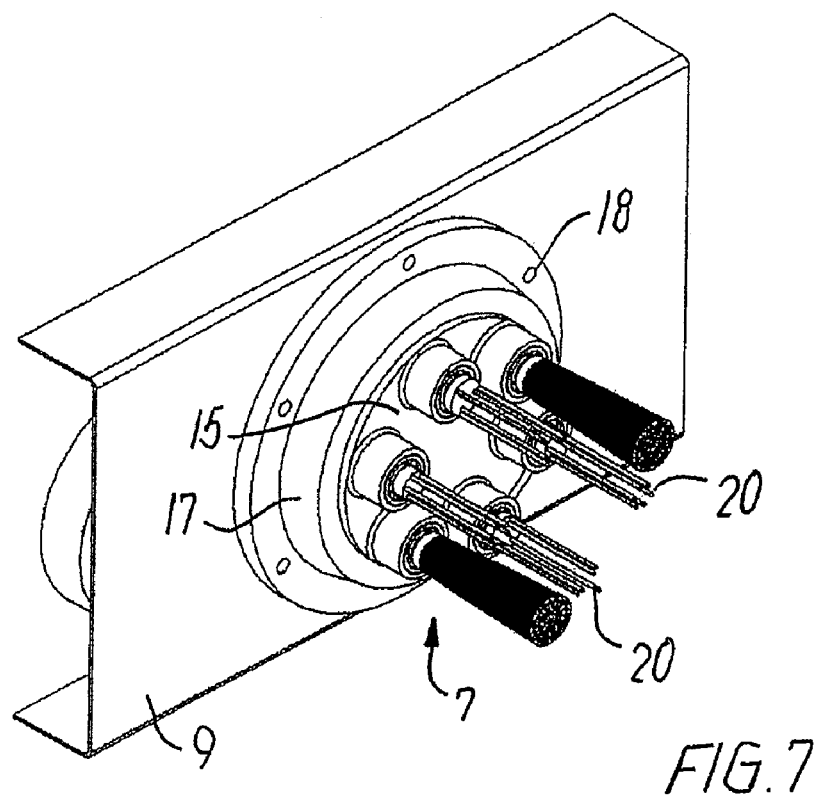
FIG. 7 is a perspective view of the first embodiment of a picking head.

Each picking head is mounted on an axle 10, and as illustrated in the embodiment of FIG. 6 axle 10 can be driven by a drive motor 11 in form of e.g. a electric, pneumatic or hydraulic motor, possibly via gear wheels 12, toothed belts or the like force-transmitting and/or torque-transmitting intermediate members. Each defeathering assembly 6 can have one common drive motor 11 for all picking heads, or the assembly can be provided with a plurality of drive motors 11 acting on respective picking heads. The latter embodiment allows some of the picking heads to be driven at changing rotational speeds without changing the rotational speed of other of the picking heads. In some embodiments drive motor 11 runs at a predetermined, constant speed, and in other embodiments drive motor 11 has a settable speed, e.g. settable on a setting device 13 on a motor control box 14, or a computer controlled speed which can depend, inter alia, on a predetermined pattern of variation of the rotational speed in relation to the current position of the bird being defeathered.

The support part 9 for the picking heads can be a housing having several parts and positions as illustrated in FIG. 2 or it can be a rigid part comprising a plate-shaped part mounted on the side of the assembly 6 facing towards the bird (FIG. 1). In the latter case the support part 9 extend in the horizontal direction and carry one or several picking heads and the drive or drives associated therewith. Several support parts can be integrated to a single support part carrying all the picking heads pertaining to one assembly 9.

Each picking head 7 has a base member 15 fixed to axle 10 on the side of support part 9 facing towards the bird to be picked. The base member 15 thus rotates together with axle 10 about a rotational axis 16 extending from support part 9 towards the path of travel or the position of the bird to be picked. Axle 10 extends through a header housing 17 which is fixed to support part 9, e. g. by screws (not shown) mounted through holes 18 in header housing 17.

A picking device 19 or more picking devices 19 are mounted in base member 15 so that the picking device can rotate with respect to the base member. The ability to rotate is preferably provided by mounting a shaft part 22 of the movable picking device in a roller bearing 25, a needle bearing, a slide bearing or another type of bearing suitable for mounting in base member 15 or in two such bearings.

Figure 3:
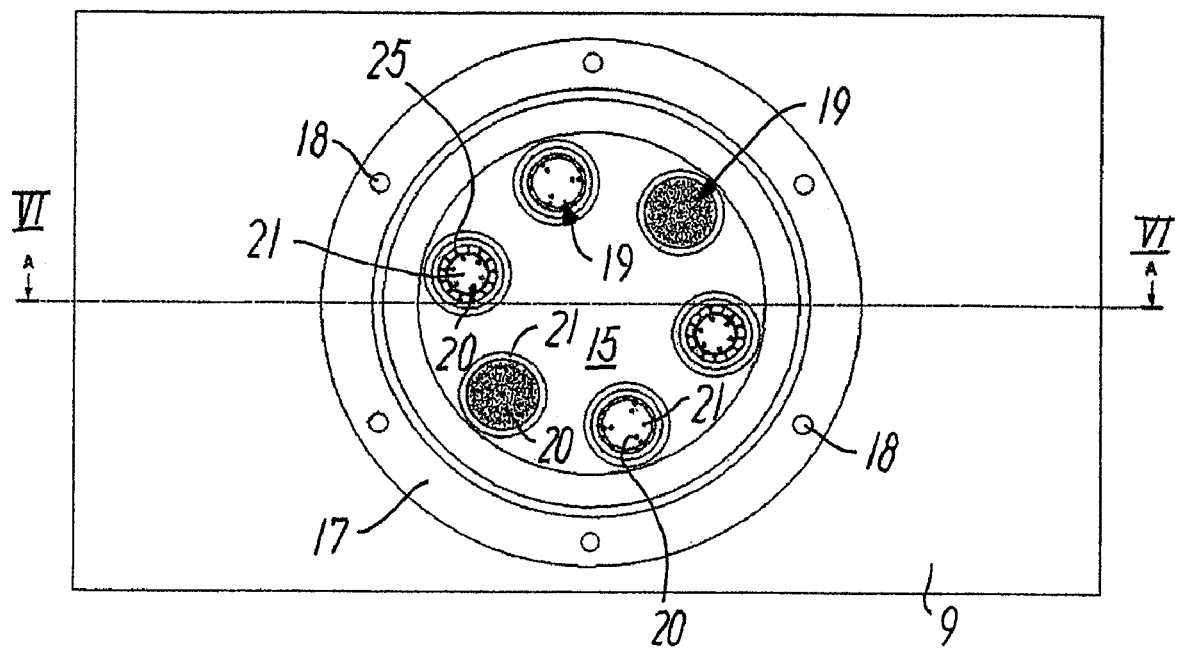
FIGS. 3 to 5 illustrate a first embodiment of a picking head used in the apparatus of FIG. 1 or 2.
Figure 4:
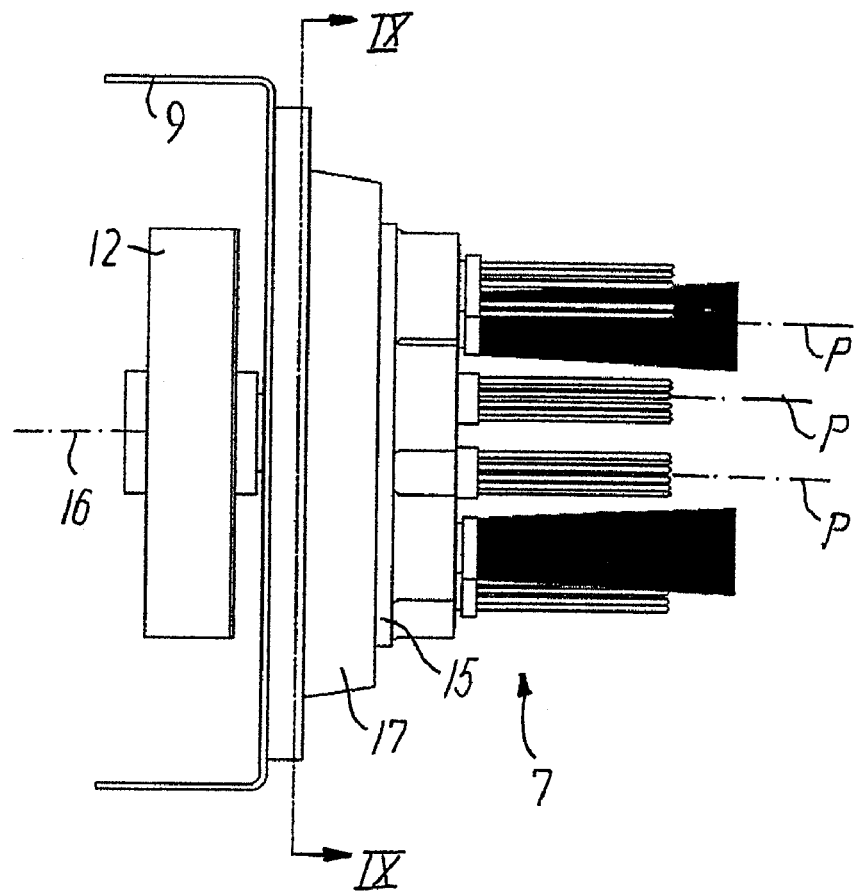
Figure 9:
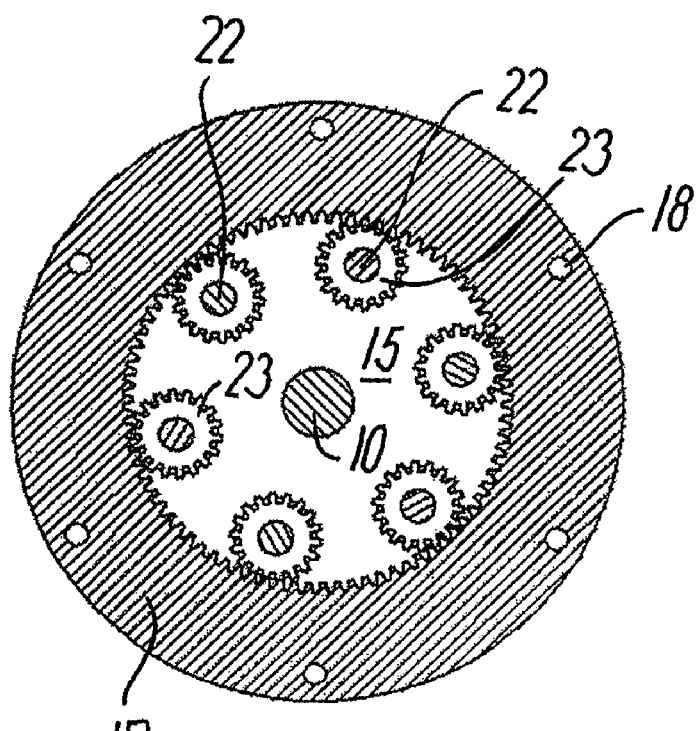
FIG. 9 is a cross-section along the line IX-IX in FIG. 3.
Figure 10:
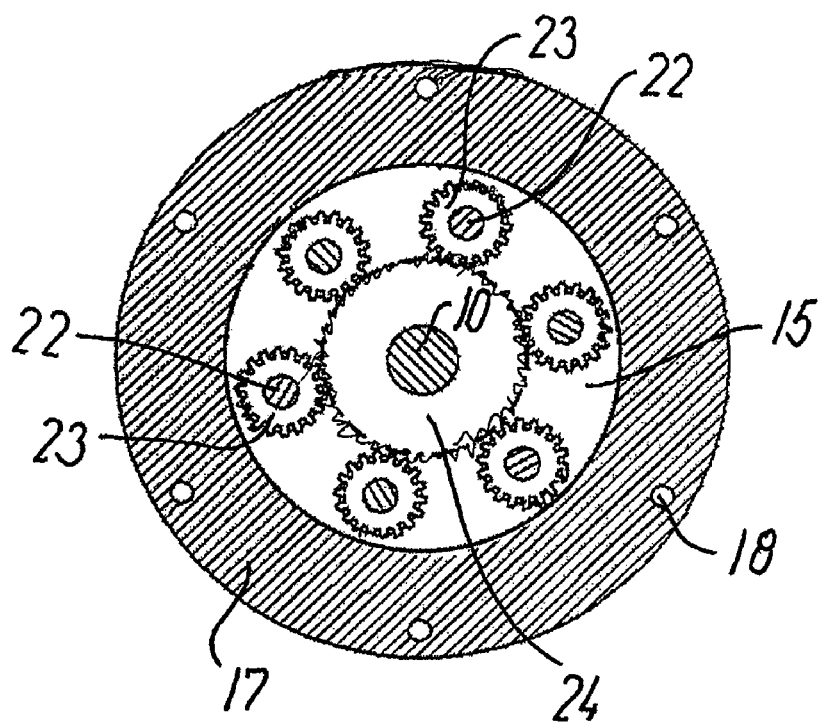
FIG. 10 is a similar cross-section through an alternative embodiment.

Each picking device 19 illustrated in FIG. 3 is provided with picking elements 20 extending from a base part 21 that is fixed to shaft part 22, which extends through base member 15 and carries a pinion 23 on the back side of base member 15 (FIG. 9 and 10). As illustrated in FIG. 9 pinions 23 can in one embodiment engage with a toothed inner rim on the lateral inner side of header housing 17. Axle 10 turns the base member 15 in relation to the header housing 17, and as the shaft parts 22 are carried in the base member 15 they participate in the rotational movement of base member 15 and in doing so they are moved relative to header housing which causes pinions 23 to turn and thus the picking devices 19 to rotate about the axis of the associated shaft part 22. As illustrated in FIG. 10 pinions 23 can in another embodiment engage with a toothed outer rim on the lateral outer side of a gear wheel 24 affixed to axle 10. In this embodiment axle 10 can rotate with respect to base member 15 and it turns gear wheel 24 in relation to base member 15. As the shaft parts 22 are carried in base member 15 they are kept stationary in relation to header housing 17 and in doing so they are caused to rotate pinions 23 and thus picking devices 19 about the axis of the associated shaft part 22.

Picking elements 20 can be of many different types. The preferred types are filaments, fibers, or bristles, viz. thin and long elements that are collected in clusters, or flexible rods having a larger diameter-to-length ratio than the first-mentioned filaments, fibres or bristles. The flexible rod has sufficient stiffness to be able to stand by itself on base member 15. The flexible rods typically have shorter length than the filaments mounted in clusters. In the drawings in FIGS. 4 to 8 the individual cluster of picking elements 20 of the filament, fibre or bristle type is drawn in black to indicate the resulting brush-like structure, whereas picking elements 20 of the flexible rod type are drawn as individual picking elements.

The most preferred material for the picking elements is a Nylon™ manufactured by Dupont under the tradename Tynex 612. Picking elements of this material preferably has a diameter in the range of 0.25 mm to 3.05 mm (10 to 120 mils) when the picking elements are for mounting in clusters, and a diameter of about 1.5 mm is presently considered very useful. For picking elements of the flexible rod type the diameter can typically be in the range of 1.5 mm to 3.05 mm (10 to 120 mils). Other types of materials can also be used, such as polymeric materials like silicone rubber, polypropylene, or polyethylene. Or the picking elements can be traditional picking fingers of natural rubber.

Figure 8:
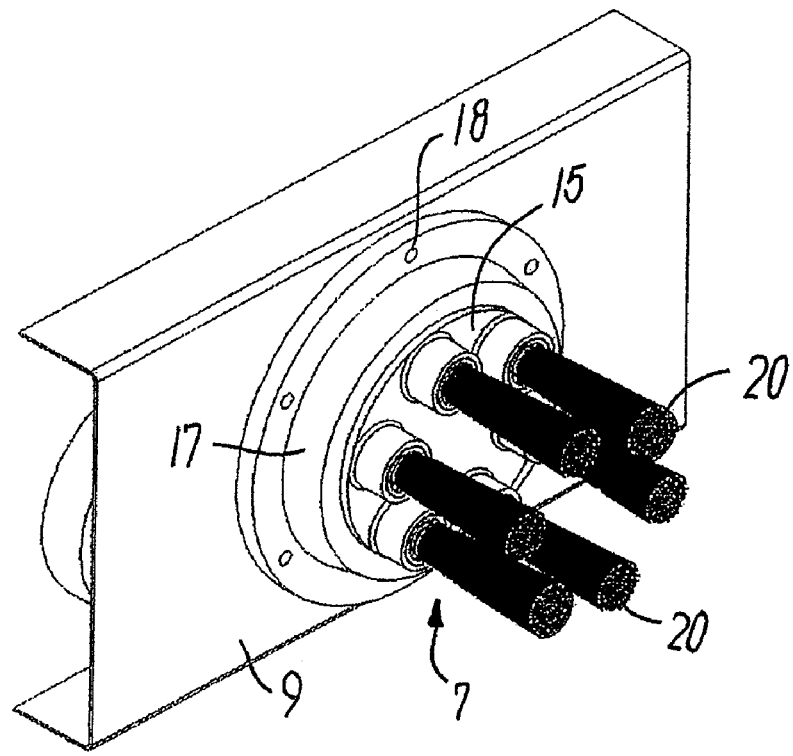
FIG. 8 is a perspective view of a second embodiment of a picking head used in the apparatus of FIG. 1 or 2.

In the embodiment illustrated in FIG. 8 all picking devices 19 on the picking head are of the same type. The type can be of a cluster of thin elements as illustrated, or it can be one having rod-like picking elements. The embodiment of the picking head illustrated in FIGS. 3 to 7 has picking devices 19 of several types. In the illustrated example the head has two picking devices with a cluster of thin elements, two picking devices with six rod-like picking elements arranged with an even distribution along the periphery of base part 21, and two picking devices with a more open arrangement of picking elements along the periphery of base part 21.

The individual picking device typically rotates about an axis P running in parallel with the rotational axis 16 of base member 15, but the axes P can also run at an angle in the range of e.g. 1 to 45° in relation to axis 16, or skewed in relation to axis 16. In preferred embodiments, the individual picking device is rotated with respect to the associated base member 15 at a speed in the range of 50 to 4000 rpm, and more preferably in the range of 300 to 1500 rpm. At the same time base member 15 preferably rotates about axis 16 with a speed in the range of from 5 to 1400 rpm, more preferably in a range from 10 to 1300 rpm, such as a speed in the range from 50 to 400 rpm.

As illustrated in the embodiment of FIG. 1 a plurality of spray jets 26 can deliver streams or sprays of water onto the birds being picked and onto the picking heads during operation of the apparatus. The illustrated embodiment has shielding plates 27 and a bottom 28 for collecting water and picked off materials and directing same to a drain opening in the bottom.

Detail of the different embodiments can be combined into new embodiments within the scope of the claims. And the picking effect can in general be increased by adapting the flexibility, thickness, length and/or configuration of the picking elements on the individual picking head to the area of the poultry to be picked by that particular picking head.

In some embodiments a very soft picking effect can be obtained by using more flexible picking elements and let them rotate at a comparatively low speed to remove small feathers and hairs, which are often difficult to remove, without causing damage to the skin. This is a special advantage for picking of ducks and geese.

The drive of the picking devices could have both an outer, as well as an inner gear rim, to make every other picking element rotate in the opposite direction as the other and yet be driven by a common gearing.

The invention claimed is:

1. Poultry defeathering apparatus comprising:
   at least one defeathering assembly,
   wherein said defeathering assembly has a support part and a plurality of picking heads mounted at the support part, each picking head having a base member provided with at least one flexible picking device, which base member is rotatable with respect to the support part of the defeathering assembly,
   wherein said at least one flexible picking device is rotatable in a rotating movement with respect to the base member on which said at least one flexible picking device is mounted, and
   wherein said at least one flexible picking device is connected to a drive for rotating said at least one flexible picking device with respect to the base member on which said at least one flexible picking device is mounted in a rotating movement different from the rotating movement of the base member with respect to the support part of the defeathering assembly.

2. Poultry defeathering apparatus as claimed in claim 1, wherein during operation of the poultry defeathering apparatus a rotational speed of said at least one picking device with respect to the base member on which said at least one flexible picking device is mounted is different from a rotational speed of this base member with respect to the support part of the defeathering assembly.

3. Poultry defeathering apparatus as claimed in claim 1, wherein during operation of the poultry defeathering apparatus the direction of rotation of the at least one picking device with respect to the base member on which said at least one flexible picking device is mounted is opposite to the direction of rotation of this base member with respect to the support part of the defeathering assembly.

4. Poultry defeathering apparatus as claimed in claim 1, wherein a plurality of picking devices are mounted mutually spaced apart on said base member.

5. Poultry defeathering apparatus as claimed in claim 4, wherein all picking devices mounted on the same base member are driven to rotate with respect to the base member by a common drive.

6. Poultry defeathering apparatus as claimed in claim 1, wherein at least some of the picking devices comprise a plurality of elongate picking elements extending from a base part mounted to the base member of the picking head.

7. Poultry defeathering apparatus as claimed in claim 6, wherein for at least some of the picking devices said plurality of elongate picking elements are arranged in a cluster on the base part.

8. Poultry defeathering apparatus as claimed in claim 1, wherein the number of picking elements on at least one of the picking devices is substantially lower than the number of picking elements on some of the other picking devices.

9. Poultry defeathering apparatus as claimed in claim 1, wherein at least one of the picking devices has only a single picking element constructed as a rubber finger.

10. Poultry defeathering apparatus as claimed in claim 1, wherein all picking devices mounted on the same base member are of the same construction.

11. Poultry defeathering apparatus as claimed in claim 1, wherein at least one of the picking heads in the defeathering assembly includes picking devices of a construction different from picking devices on other of the picking heads in said defeathering assembly.

12. Poultry defeathering apparatus as claimed in claim 1, wherein at least one picking head in the assembly includes at least two different types of picking devices.

13. Poultry defeathering apparatus as claimed in claim 1, wherein the rotational speed of at least one picking device with respect to the associated base member is adjustable or can be set to a predetermined value, or can be set to follow a predetermined pattern of variation during defeathering of a bird.

14. Poultry defeathering apparatus as claimed in claim 1, wherein the rotational speed of at least one base member with respect to the support part of the defeathering assembly is adjustable or can be set to a predetermined value, or can be set to follow a predetermined pattern of variation during defeathering of a bird.

15. Poultry defeathering apparatus comprising;
   at least one defeathering assembly,
   wherein said defeathering assembly has a support part and a plurality of picking heads mounted at the support part, and the individual picking head has a base member provided with at least one flexible picking device, which base member is rotatable with respect to the support part of the defeathering assembly,
   wherein said at least one flexible picking device is rotatable in a rotating movement with respect to the base member on which said at least one flexible picking device is mounted, and
   wherein at least one of the picking heads in the defeathering assembly includes picking devices of a construction different from picking devices on other of the picking heads in said defeathering assembly.

16. Poultry defeathering apparatus as claimed in claim 15, wherein all picking devices mounted on the same base member are driven to rotate with respect to the base member by a common drive.

17. Poultry defeathering apparatus as claimed in claim 15, wherein at least one of the picking devices has only a single picking element constructed as a rubber finger.

18. Poultry defeathering apparatus as claimed in claim 15, wherein for at least some of the picking devices said plurality of elongate picking elements are arranged in a cluster on the base part.

19. Poultry defeathering apparatus as claimed in claim 15, wherein the number of picking elements on at least one of the picking devices is substantially lower than the number of picking elements on some of the other picking devices.

20. Poultry defeathering apparatus comprising
at least one defeathering assembly,
wherein said defeathering assembly has a support part and a plurality of picking heads mounted at the support part, and the individual picking head has a base member provided with at least one flexible picking device, which base member is rotatable with respect to the support part of the defeathering assembly,
wherein said at least one flexible picking device is rotatable in a rotating movement with respect to the base member on which said at least one flexible picking device is mounted, and
wherein at least one of the picking heads in the defeathering assembly includes picking devices of a construction different from picking devices on other of the picking heads in said defeathering apparatus.

21. Poultry defeathering apparatus as claimed in claim 20, wherein during operation of the poultry defeathering apparatus a direction of rotation of the at least one picking device with respect to the associated base member is opposite to a direction of rotation of this base member with respect to the support part of the defeathering assembly.

22. Poultry defeathering apparatus as claimed in claim 21, wherein all picking devices mounted on the same base member are driven to rotate with respect to the base member by a common drive.

23. Poultry defeathering apparatus as claimed in claim 20, wherein at least one of the picking heads in the assembly includes at least two different types of picking devices.

24. Poultry defeathering apparatus as claimed in claim 20, wherein a rotational speed of at least one picking device with respect to the associated base member is adjustable or can be set to a predetermined value, or can be set to follow a predetermined pattern of variation during defeathering of a bird.

25. Poultry defeathering apparatus as claimed in claim 20, wherein a rotational speed of at least one base member with respect to the support part of the defeathering assembly is adjustable or can be set to a predetermined value, or can be set to follow a predetermined pattern of variation during defeathering of a bird.

\* \* \* \* \*